(12) United States Patent
Spooner et al.

(10) Patent No.: US 9,920,747 B2
(45) Date of Patent: Mar. 20, 2018

(54) TURBULENCE PROTECTION SYSTEM AND METHOD FOR TURBINE GENERATORS

(71) Applicant: OPENHYDRO IP LIMITED, Dublin (IE)

(72) Inventors: Edward Spooner, Bishop Auckland (GB); Simon Cawthorne, Carlingford (IE)

(73) Assignee: Openhydro IP Limited (IE)

( * ) Notice: Subject to any disclaimer, the term of this patent is extended or adjusted under 35 U.S.C. 154(b) by 9 days.

(21) Appl. No.: 15/034,432

(22) PCT Filed: Nov. 3, 2014

(86) PCT No.: PCT/EP2014/073604
§ 371 (c)(1),
(2) Date: May 4, 2016

(87) PCT Pub. No.: WO2015/067567
PCT Pub. Date: May 14, 2015

(65) Prior Publication Data
US 2016/0281684 A1    Sep. 29, 2016

(30) Foreign Application Priority Data
Nov. 5, 2013  (EP) ..................................... 13191559

(51) Int. Cl.
*F03B 13/00*  (2006.01)
*F03B 13/10*  (2006.01)
(Continued)

(52) U.S. Cl.
CPC ............. *F03D 9/003* (2013.01); *F01D 15/10* (2013.01); *F03D 9/255* (2017.02);
(Continued)

(58) Field of Classification Search
USPC ............... 290/43, 44; 307/9.1; 700/295, 298
See application file for complete search history.

(56) References Cited

U.S. PATENT DOCUMENTS 5,083,039 A * 1/1992 Richardson ........... F03D 7/0272
290/44
5,225,712 A * 7/1993 Erdman ................ F03D 7/0272
290/44

(Continued)

FOREIGN PATENT DOCUMENTS

EP    2 549 613 A1    1/2013
WO    WO 99/50945 A1    10/1999

OTHER PUBLICATIONS

International Search Report for Application No. PCT/EP2014/073604 dated Feb. 3, 2015.

*Primary Examiner* — Pedro J Cuevas
(74) *Attorney, Agent, or Firm* — Tarolli, Sundheim, Covell & Tummino LLP (57) ABSTRACT

A method of controlling power provided by a generator to an end system in which power is diverted from the output of said generator to an auxiliary system during periods of excessive power output from the generator. The diverted power is stored in an energy store and, during periods of lower power output from the generator, is returned to the end system by discharging the energy store. The diversion and return of power is controlled to maintain the power delivered to the end system at a desired mean power level. Diversion of power from the generator also has the effect of preventing the generator from producing excessive voltage levels.

20 Claims, 5 Drawing Sheets

(51) Int. Cl.
*H02P 9/04* (2006.01)
*F03D 9/00* (2016.01)
*H02H 7/12* (2006.01)
*F01D 15/10* (2006.01)
*F03D 9/25* (2016.01)

(52) U.S. Cl.
CPC ..... *H02H 7/1216* (2013.01); *F05B 2270/107* (2013.01); *Y02E 10/725* (2013.01)

(56) References Cited

U.S. PATENT DOCUMENTS

| | | | | |
|---|---|---|---|---|
| 6,239,997 B1* | 5/2001 | Deng | ............... | H02J 3/38 363/95 |
| 7,312,537 B1* | 12/2007 | Walling | ............... | H02J 3/16 290/44 |
| 7,397,143 B2* | 7/2008 | Walling | ............... | H02J 3/16 290/44 |
| 7,690,456 B2* | 4/2010 | Deng | ............... | B60K 6/26 180/65.265 |
| 7,818,159 B2* | 10/2010 | Kim | ............... | G01R 31/343 703/18 |
| 8,400,740 B2* | 3/2013 | Schumacher | ............... | B63H 21/17 361/54 |
| 8,643,215 B2* | 2/2014 | Schweitzer, III | ............... | B60L 11/1842 307/64 |
| 8,680,707 B2* | 3/2014 | Childs | ............... | H02P 25/22 307/9.1 |
| 8,788,108 B2* | 7/2014 | Kulathu | ............... | H02J 3/14 700/286 |
| 9,347,429 B2* | 5/2016 | Nielsen | ............... | F03D 7/00 |
| 9,484,850 B2* | 11/2016 | Hyypio | ............... | H02P 9/14 |
| 9,490,626 B2* | 11/2016 | Elliott, II | ............... | H02J 3/38 |
| 9,543,748 B2* | 1/2017 | Andersen | ............... | H02H 7/26 |
| 9,754,717 B2* | 9/2017 | Long | ............... | H01F 38/14 |
| 9,804,623 B2* | 10/2017 | Ansari | ............... | G05F 1/66 |
| 9,806,665 B2* | 10/2017 | Johnson | ............... | H02S 10/00 |
| 2005/0184589 A1* | 8/2005 | Fujita | ............... | B63J 3/04 307/19 |
| 2007/0012492 A1* | 1/2007 | Deng | ............... | B60K 6/26 180/65.1 |
| 2007/0290506 A1* | 12/2007 | Walling | ............... | H02J 3/16 290/44 |
| 2008/0052059 A1* | 2/2008 | Kim | ............... | G01R 31/343 703/13 |
| 2008/0093855 A1* | 4/2008 | Walling | ............... | H02J 3/16 290/44 |
| 2008/0182466 A1* | 7/2008 | Wegner-Donnelly | ............... | B63H 23/24 440/84 |
| 2009/0008937 A1 | 1/2009 | Erdman | | |
| 2011/0320052 A1* | 12/2011 | Yasugi | ............... | H02J 3/16 700/287 |
| 2012/0243136 A1 | 9/2012 | Mossoba | | |
| 2013/0073109 A1* | 3/2013 | Cheng | ............... | H02J 3/40 700/298 |
| 2013/0215543 A1* | 8/2013 | Hoeven | ............... | H02H 3/081 361/63 |
| 2013/0270902 A1* | 10/2013 | Andersen | ............... | H02H 7/26 307/9.1 |
| 2013/0271879 A1* | 10/2013 | Andersen | ............... | B63J 3/00 361/20 |
| 2014/0225457 A1* | 8/2014 | Elliott, II | ............... | H02J 3/38 307/125 |
| 2016/0099566 A1* | 4/2016 | Murphy | ............... | H02J 3/50 700/298 |
| 2016/0268831 A1* | 9/2016 | Spooner | ............... | F03B 15/16 |
| 2017/0207716 A1* | 7/2017 | Shakeel | ............... | H02M 1/42 |
| 2017/0235286 A1* | 8/2017 | Inam | ............... | H02J 3/00 700/295 |
| 2017/0237255 A1* | 8/2017 | Inam | ............... | H02J 3/06 700/295 |
| 2017/0250540 A1* | 8/2017 | Varma | ............... | H02M 7/44 |
| 2017/0279376 A1* | 9/2017 | Siri | ............... | H02M 7/53871 |

* cited by examiner

KEY: Real Power   Reactive Power

TURBULENCE PROTECTION SYSTEM AND METHOD FOR TURBINE GENERATORS

RELATED APPLICATIONS

The present invention is a U.S. National Stage under 35 USC 371 patent application, claiming priority to Serial No. PCT/EP2014/073604, filed on 3 Nov. 2014; which claims priority from EP 13191559.7, filed 5 Nov. 2013, the entirety of both of which are incorporated herein by reference.

FIELD OF THE INVENTION

The present invention relates to protection against turbulence for a turbine power generator, in particular wind or tidal stream turbine generators.

BACKGROUND TO THE INVENTION

Figure 1:
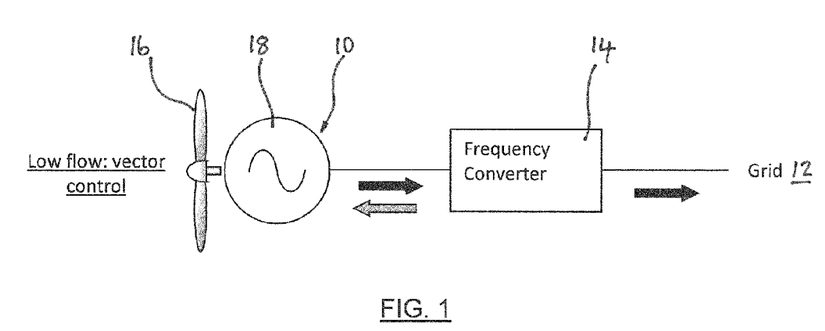
FIG. 1 is a block diagram of an electrical generator system showing real and reactive power transfers when fluid flow velocity is relatively low or moderate.

FIG. 1 shows a block diagram of an electrical generator system comprising a turbine generator 10 for supplying electrical power to an electrical grid 12 via a frequency converter 14. The turbine generator comprises a turbine 16 coupled to an electrical generator 18. The turbine 16 is driven by a fluid, typically air or water, the specific construction of the turbine 16 typically depending at least in part on the driving fluid. The most common types of turbine generators 10 are driven by wind or by tidal streams/currents.

In use, the turbine 16 drives the generator 18 to produce AC electrical power by means of an AC electrical output signal. Most turbines are operable with a variable rotor speed and so variations in wind speed or tidal flow rate can cause a corresponding variation in the frequency of the generator output signal. The frequency converter 14 stablizes the frequency of the output signal to compsensate for wind or tidal flow variations. In particular, the frequency converter 14 adapts the frequency of the generator output signal to suit the frequency requirements of the grid 12.

However, the variation in fluid flow rate can be substantial—for example for a typical wind or tidal turbine generator fluid velocity can vary up to 40% about a mean value—and this can cause problems relating to voltage and power control.

Variations in the rotational speed of the turbine 16 can cause a corresponding variation in the voltage level produced by the generator 18, particularly in the case where the generator 18 is a permanent magnet generator. In many cases, the pitch of the turbine blades is fixed, which exacerbates this problem. For turbines that have variable pitch rotor blades, pitch control can compensate for turbulence but at the expense of wear on the pitch mechanism and the requirement of a fast-acting control system.

One solution to this problem is to use a frequency converter that has the capacity to withstand the highest anticipated temporary high voltage. However this is undesirable for reasons of cost. Another solution is to isolate the frequency converter in the event of extreme voltage excursions from the generator to avoid damage to the input stage of the converter. However, this creates an undesirable interruption in supply to the grid 12 and creates a further problem of how to manage re-connection of the converter.

A further issue is that variations in flow velocity cause variations in the power of the generator output. In particular, it may be seen that output power of the turbine generator 10 varies with flow velocity cubed. Extra energy is associated with turbulence because for every short interval, $\Delta T$, when the flow velocity is higher than the mean, $V_{mean}+\delta$, there is a corresponding period when the flow velocity is lower to the same extent, $V_{mean}-\delta$. The energy delivered during those two intervals is proportional to $\Delta T \cdot (V_{mean}+\delta)^3 + \Delta T \cdot (V_{mean}-\delta)^3$, which is equal to $2 \cdot \Delta T \cdot V^3_{mean} \cdot \{1+3 \cdot (\delta/V_{mean})^2\}$ and typically represents 4-5% additional power compared with a steady flow. This may be regarded as an opportunity not a problem but action is required to benefit from the opportunity. One option is to keep the converter connected during the period of higher flow and transmitting the maximum power during that period. However, that would involve having a very highly rated converter.

Fluctuating power is not desirable for operation of the grid 12, although it is less of a problem for a turbine farm where the outputs of multiple turbine generators are aggregated before supply to the grid than it is for instances where a singe generator, or a small number of generators, are connected to the grid 12.

It would be desirable to provide a turbine generator system mitigating the above problems.

SUMMARY OF THE INVENTION

A first aspect of the invention provides a method of protecting a device from excessive voltages produced by a generator, the method comprising:

monitoring the voltage level produced by the generator; and operating, in response to determining that said voltage level exceeds a threshold value, an auxiliary system to absorb reactive power from said generator.

In some embodiments, the method includes monitoring the power produced by the generator. Optionally, said method includes diverting, in response to said monitored power or said monitored voltage exceeding a respective threshold level, at least some of the power from the output of said generator to the auxiliary system; charging at least one energy storage device with said diverted power; and, preferably delivering, in response to said monitored power or said monitored voltage being below a respective threshold level, power to said end system from said auxiliary system by discharging said at least one energy storage device.

Typically, said operating and/or said diverting and delivering of power is performed in response to variations in voltage or power produced directly by said generator. Said diverting preferably involves diverting at least some of the power produced directly by said generator. Said diverting preferably involves diverting said at least some power away from an input of a frequency converter. Said diverting preferably involves diverting at least real power to said auxiliary system, preferably real power and reactive power.

Said delivering may involve delivering power from the auxiliary system to the input of said frequency converter, or to an output of said frequency converter. In some embodiments, said frequency converter provides power to said end system via a transformer, wherein said delivering involves delivering power from said auxiliary system to the same side of said transformer as said frequency converter. Said delivering may involve delivering power from said auxiliary system to the same winding of said transformer as said frequency converter, or to a separate winding of said transformer to said frequency converter. In some embodiments, said delivering involves delivering power from the auxiliary system to an intermediate section of said frequency converter.

Said frequency converter typically comprises a rectifier-inverter architecture. Said intermediate section is located between the rectifier and the inverter. Said frequency converter may comprise a DC link between the rectifier and the inverter, said delivering involving delivering power from said auxiliary circuit to said DC link.

In typical embodiments said frequency converter comprises an AC to DC to AC frequency converter. Said frequency converter advantageously comprises an electronic frequency converter.

Said diverting and delivery of power typically involves, respectively, diverting and delivery of an electrical signal carrying said power. Said diverting typically involves diverting an AC electrical signal from the output of said generator. Said delivering involves delivering an AC electrical signal to said end system from said auxiliary system.

The auxiliary circuit typically includes means for performing AC to DC rectification of said electrical signal prior to said charging, said charging involving charging said at least one energy storage device with the rectified electrical signal by any suitable charging means.

Said discharging involves discharging a DC electrical signal from said at least one energy storage device. Typically, means are provided for performing DC to AC inversion of said discharging electrical signal and delivering the inverted AC signal to said end system. Said AC electrical signals typically comprise multi-phase, typically 3-phase, AC electrical signals.

In typical embodiments, said end system comprises an electrical supply grid.

Other preferred features are recited in the dependent claims. A second aspect of the invention provides a power generation system comprising a generator coupled to an end system, and an auxiliary system configured to selectably present an inductive load to the output of said generator, the system further including:

monitoring means for monitoring the voltage level produced by the generator; and operating means for operating, in response to determining that said voltage level exceeds a threshold value, said auxiliary system to absorb reactive power from said generator.

Preferably said operating means is arranged to operate said auxiliary circuit not to absorb reactive power from said generator upon determining that the voltage level output by said generator is below said threshold value or a second threshold value.

Said auxiliary system is typically configured to provide a reactive load, e.g. an inductive load, to said generator.

The system may include means for diverting, in response to said monitored voltage level exceeding a threshold level, at least some of the power from the output of said generator to said auxiliary system; and means for charging at least one energy storage device with said diverted power.

The system may include means for delivering, in response to said voltage being less than said threshold value or said second threshold value or in response to the power produced by the generator being below a threshold level, power to said end system from said auxiliary system by discharging said at least one energy storage device.

In preferred embodiments said generator is a single generator, said monitoring, operating and, when applicable, said diverting and said delivering being performed in respect of said single generator.

Typically, said generator comprises a turbine generator for generating power in response to flow of a driving fluid, and wherein said monitoring, operating and, when applicable, said diverting and said delivering are performed in response to variations in voltage level generated by said generator as a result of fluctuations in the rate of flow of said driving fluid.

Typically, power is provided from said generator to said end system via a frequency converter, and said operating means is configured to operate said auxiliary system to absorb reactive power from a location at or before the input of said frequency converter.

Said auxiliary system may be selectably connectable directly or indirectly to the output of said generator by a switching device. The auxiliary system may comprise one or more inductors or other inductive load. The auxiliary system may comprise means for charging said at least one energy store. Said charging means may comprise an AC to DC converter.

A third aspect of the invention provides a method of controlling power provided by a generator to an end system, the method comprising:

monitoring the power produced by the generator;

diverting, in response to said monitored power exceeding a threshold level, at least some of the power from the output of said generator to an auxiliary system;

charging at least one energy storage device with said diverted power;

delivering, in response to said monitored power being below a threshold level, power to said end system from said auxiliary system by discharging said at least one energy storage device.

Preferably means are provided for controlling said diverting and delivering of power to maintain the power delivered to said end system within a desired power level band.

Preferably, means are provided for controlling said diverting and delivering of power to maintain the power delivered to said end system at a desired mean power level.

A fourth aspect of the invention provides a power generation system comprising a generator coupled to an end system, and an auxiliary system comprising at least one energy storage device, the system further including:

monitoring means for monitoring the power produced by the generator;

diverting means for diverting, in response to said monitored power exceeding a threshold level, at least some of the power from the output of said generator to said auxiliary system;

charging means for charging said at least one energy storage device with said diverted power;

and delivering means for delivering, in response to said monitored power being below a threshold level, power to said end system from said auxiliary system by discharging said at least one energy storage device.

Other advantageous aspects of the invention will become apparent to those ordinarily skilled in the art upon review of the following description of specific embodiments and with reference to the accompanying drawings.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Figure 2:
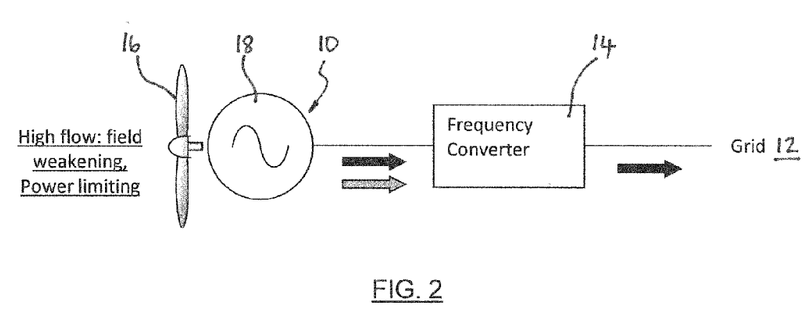
FIG. 2 is a block diagram of the system of FIG. 1 showing real and reactive power transfers when fluid flow velocity is relatively high.

Referring again to FIG. 1, under normal operating conditions, for example when the turbine 16 is driven by fluid with relatively low or moderate flow speed, the frequency converter 14 operates, preferably but not necessarily in vector control, such that real power flows from the turbine generator 10 to the grid 12 via the converter 14, while reactive power flows from the converter to the generator 10. With reference to FIG. 2, in conditions of relatively high flow speed, the frequency converter 14 is configured to absorb reactive power from the turbine generator 10. This has a field weakening effect on the generator 18. As a result, the terminal voltage of the generator 18 is reduced and the frequency converter voltage limit is not exceeded. This form of control may extend up to the current limit (and/or voltage limit as applicable) of the frequency converter 14. Under the conditions described for FIGS. 1 and 2, problems with excessive voltage or power from the turbine generator 10 do not arise.

Figure 3:
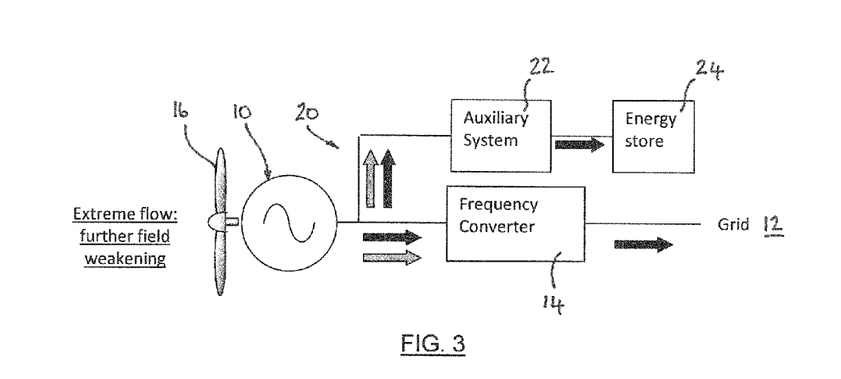
FIG. 3 is a block diagram of an electrical generator system including a turbulence compensation system embodying one aspect of the invention, the diagram showing real and reactive power transfers when fluid flow velocity is at an extreme level.

Referring now to FIG. 3, an electrical generator system 20 is shown which is similar to the system shown in FIGS. 1 and 2 but which further includes an auxiliary system 22 for turbulence compensation. In preferred embodiments, the system 20 also includes an energy store 24 capable of storing electrical energy. The auxiliary system 22 is connected to the system 20 at a location L between the turbine generator 10 and the frequency converter 14, e.g. connected to the output of the generator 10 or to the input of the frequency converter 10. The auxiliary system 22 is configured such that it presents a reactive impedance to the system 20 at the location L and so absorbs reactive power from the turbine generator 10. In particular, the auxiliary system 22 is configured and/or operable such that it absorbs reactive power from the generator 10 during periods when the fluid flow driving the turbine 16 may be regarded as extreme (e.g. above a threshold level) and which, without compensation, would cause excessive voltage or power from the generator 10. The reactive power absorbed by the auxiliary system 22 has a field weakening effect on the generator 18 which reduces the output voltage of the generator 18 (in comparison to the case where the auxiliary system 22 is not present) and so reduces the voltage level at the input of the frequency converter 14.

In typical embodiments, a switch (not shown in FIG. 3) is provided to selectively connect or disconnect the auxiliary system 22 to the system 20. The switch is operated by a controller (not shown in FIG. 3) that may monitor any one or more of the voltage, current and/or power at the output of the turbine generator 10 and/or the input of the frequency converter 14 by any convenient means, and operate the switch to connect or disconnect the auxiliary system 22 when the monitored characteristic(s) exceed a respective threshold level. The respective threshold level may be determined by the voltage and/or current limit of the frequency converter 14 and/or with respect to a desired mean power level.

In preferred embodiments, the auxiliary system 22 is configured to draw real power (as well as reactive power) from the generator 10 and advantageously to transfer real power from the generator 20 to an electrical energy store 24. In particular, the auxiliary system 22 is configured and/or operable such that it draws real power during periods when the fluid flow driving the turbine 16 may be regarded as extreme (e.g. above a threshold level) and which, without compensation, would cause excessive voltage or power from the generator 10. As a result the real power transferred to the grid 12 via the frequency converter 14 is correspondingly reduced when the auxiliary system 22 is in-circuit. Hence, in the preferred embodiment, when the auxiliary system 22 is in-circuit, it reduces the voltage level and power level received by the frequency converter 14 from the generator 10.

In some embodiments, or in one mode of operation, the auxiliary circuit is switched in-circuit or out-of-circuit depending on a voltage level detected at the output of the turbine generator 10 and/or at the input of the frequency converter 14. The purpose of this is to protect the frequency converter 14 from excessive voltages during periods of turbulence resulting in extreme flow rates, while allowing it to remain connected to the generator 10 and so to continue supplying electrical power to the grid 12. To this end, the voltage threshold level for bringing the auxiliary system 22 in-circuit may be determined by the voltage rating of the frequency converter 14. Any suitable voltage monitor (not shown) may be used to monitor the voltage, and the relevant voltage may be measured directly or indirectly as is convenient.

In preferred embodiments, or in one mode of operation, the auxiliary circuit 22 is switched in-circuit or out-of-circuit depending on the power level at the output of the turbine generator 10 and/or at the input of the frequency converter 14. Any suitable power meter (not shown) may be employed for this purpose. It will be apparent that the relevant power level may be measured at any convenient point in the system 20, e.g. directly from the output of the turbine generator 10 and/or at the input of the frequency converter 14 or indirectly from elsewhere in the system. When the auxiliary circuit 22 is in-circuit in this mode of operation, it diverts real power from the generator system 20 to the energy store 24. In particular power is diverted from the output of the generator 10, i.e. at the output of the generator 18, at the input of the frequency converter 14 or from a location in between. The aim of this approach is to smooth the real power provided to grid 12 by diverting excessive real power from the generator system 20 during periods of turbulence resulting in extreme flow rates. To this end, the power threshold level for bringing the auxiliary system 22 in-circuit may be determined by a desired mean power level. More generally, the auxiliary system may be operated to maintain the power delivered to said end system within a desired power level band, or more particularly at a desired power level, especially a desired mean power level.

Advantageously, because the auxiliary system 22 absorbs reactive power, it is found that operating the auxiliary circuit 22 in this way also has the effect of restricting the voltage level provided to the frequency converter 14 by the generator 10 and so protects the frequency converter 14 from excessive voltages.

The auxiliary system 22 may be designed in any convenient manner, for example by computer simulation, in order to exhibit the desired reactance or inductance and to cause the desired amount of real power transfer.

Advantageously, electrical energy stored in the energy store 24 is returned to the generator system 20 as real power as is now described in more detail with reference to FIG. 4. The energy is typically returned during periods of relatively low or moderate fluid flow, for example when the generator system 20 is operating in a normal mode as illustrated in FIG. 1. The energy may be delivered to any convenient point in the system 20, for example at the input to the frequency converter 14 (or more generally between the output of the generator 10 and the input of the frequency converter 14), or to a point between the input and the output of the frequency converter 14, or to the grid 12 (or other end system), or more generally to a point after the output of the frequency converter 14, or to any combination of one or more of these locations. In any event, the returned power is delivered to the grid 12 (or other end system) by discharging the energy store 24 during periods of relatively low or moderate fluid flow.

In typical embodiments, a switch (not shown in FIG. 4) is provided to selectively connect or disconnect the auxiliary system 22 to the system 20 for the return of energy (which, depending on the embodiment, may or may not be the same switch described above with reference to FIG. 3). The switch is operated by a controller (not shown in FIG. 4 but which is typically the same controller referred to with reference to FIG. 3) that may monitor any one or more of the voltage, current and/or power at the output of the turbine generator 10 and/or at the input of the frequency converter 14 by any convenient means, and operate the switch to connect or disconnect the auxiliary system 22 when the monitored characteristic(s) meet a respective threshold level.

It is particularly preferred that the stored energy is returned to the generator system 20 in order to smooth the real power provided to the grid 12 to compensate for the effects of turbulence. Accordingly the auxiliary system 22 is caused to return energy to the system 20 when the controller determines that the power output from the generator 10 drops below a threshold level, for example the desired mean power level. The function of switching the auxiliary system 22 to return energy to the system 22 may be effected electronically within the output section of the auxiliary system 22, Hence, in the preferred embodiment, depending on the detected power level output by the generator 10, the auxiliary system 22 is caused to transfer real power from the system 20 to the energy store 24 or return stored energy to the system 20 in order to smooth the real power provided to the grid 12 (or other end system) with respect to a desired mean power level. Advantageously, this is performed to compensate for the effects of turbulence on the (real) power provided to the grid 12 by the generator 10. As such, cycles of storing and returning energy are performed over relatively short periods, typically in the order of seconds (e.g. up to 60 seconds) or minutes (e.g. up to 60 minutes, but more typically up to approximately 10 minutes).

Figure 4:
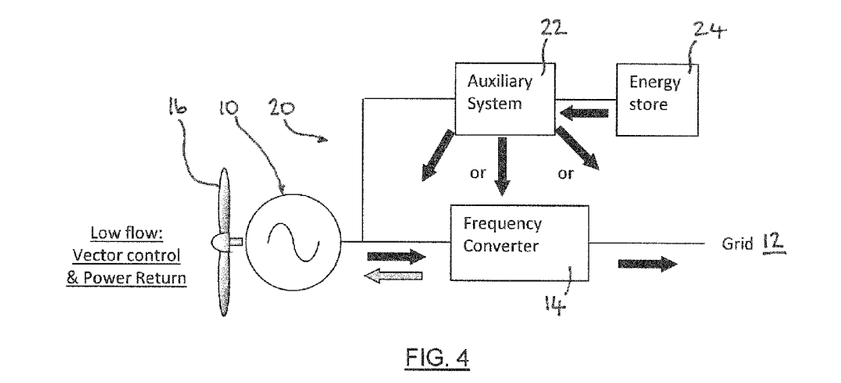
FIG. 4 is a block diagram of the system of FIG. 3 showing real and reactive power transfers when fluid flow velocity is relatively low or moderate.

In FIGS. 3 and 4, the auxiliary system 22 is shown as a unit but it will be appreciated that the auxiliary circuit 22 may be implemented in any convenient manner and may comprise respective separate parts for performing any one or more of absorbing reactive power, transferring real power to the energy store 24 and returning electrical energy to the system 20. Each part may be independently operable by the controller.

The auxiliary system 22 is preferably designed so that it does not absorb reactive power when it is returning energy to the system 20, i.e. not to present an inductive load to the system 20 in this mode, Referring now to FIGS. 5 to 10, specific embodiments are described by way of example. Like numerals are used to denote like parts and the same or similar description applies to each as would be apparent to a skilled person or unless otherwise indicated. Each embodiment includes a generator system 120 comprising an electrical generator 118, which is typically part of a turbine generator (although the turbine is not shown in FIGS. 5 to 10) but which may alternatively be driven by other means.

The system 120 includes a frequency converter 114, typically an ac-dc-ac frequency converter. The frequency converter 114 may be conventional. The frequency converter 114 comprises an ac-to-dc converter stage 132 and a dc-to-ac inverter stage 134 (each of which may be of conventional construction and operation) coupled by a DC link 136. The frequency converter 114 is typically an electronic frequency converter, i.e. comprised of electronic circuitry. Preferably, the converter 132 and inverter 134 comprise suitable configured voltage-source inverters 138 although other conventional electronic architectures could alternatively be used. The DC link 136 typically comprises a capacitor in parallel with and between the converter 132 and inverter 134.

In each embodiment, the generator system 120 supplies electrical power to an electrical grid (not shown in FIGS. 5 to 10) via an electrical transformer 130. Typically, the frequency converter 114 supplies electrical power to the transformer 130. In alternative embodiments the generator system may be connected to other end systems, particularly electricity delivery networks, rather than an electrical grid.

In embodiments where the generator 118 is part of a turbine generator, the turbine may be a wind turbine or a tidal-stream/tidal current turbine. Typically, the generator 118 is a permanent magnet generator, especially where the generator 118 is part of a wind or tidal stream turbine generator. The turbine may have blades with fixed or variable pitch. In preferred embodiments, the system 120 comprises a single generator 118 connected to the frequency converter 114. Typically, the generator 118 (and turbine when present) are co-located at a common site, for example an off-shore turbine station. The system 120 may feed electrical power to the grid, or other end system individually or in combination with one or more other electrical generator systems (not shown).

A controller 140 is provided for controlling the operation of the generator system 120, in particular the operation of the respective stages of the frequency converter 114 as required. Such control may be conventional. As is described in more detail hereinafter, the controller 140 conveniently also controls operation of the auxiliary circuit 122. The controller 140 may take any suitable conventional form, for example a suitably programmed microprocessor, microcontroller or other logic device.

Figure 5:
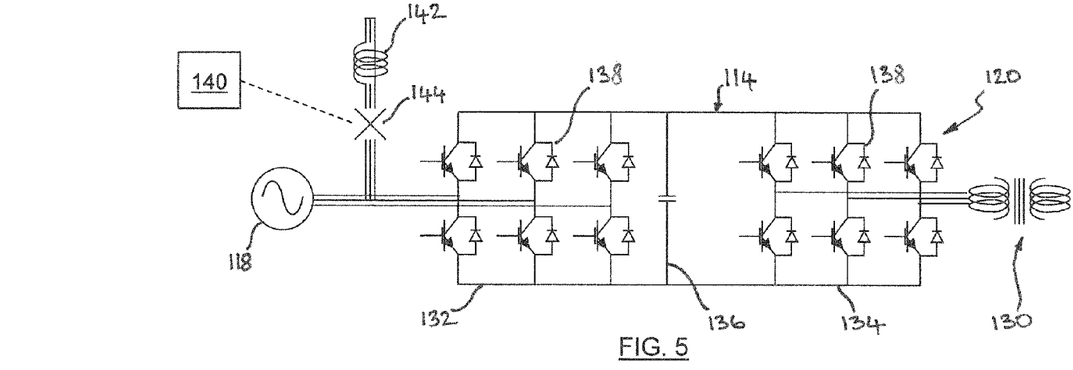
FIG. 5 is a schematic diagram of a first embodiment of an electrical generator system embodying one aspect of the invention.

Referring now in particular to the embodiment of FIG. 5, the generator system 120 includes an auxiliary system 122 for compensating for the effects of a variable output signal from the generator 118, particularly as a result of turbulence. In this case, the function of the auxiliary system 122 is to reduce voltage level output by the generator 120. The auxiliary system 122 comprises a reactive load, in particular a 3-phase reactive load 142, for example a 3-phase inductor or other inductive load. The auxiliary system 122 includes a switch 144 for selectably connecting or disconnecting the auxiliary system 122 to the generator system 120, e.g. to the output of the generator 118, or the input of the frequency converter 114, or a point inbetween (any of which may be the same point electrically). In this example, the switch 144 comprises a 3-phase switch. Preferably, the switch 144 is a solid state switch. When the auxiliary circuit 122 is connected to the system 120, the load 142 absorbs reactive power from the generator 118. This contributes to the field weakening effect in the generator 120 and allows the frequency converter 114 to remain connected to the generator 118 during periods when, otherwise, excessive voltage levels from the generator 118 may damage the converter 114, e.g. during periods of excessively high fluid flow velocity caused by turbulence. A voltage monitor (not shown) is provided to monitor (directly or indirectly as convenient) the output voltage of the generator 118. The controller 140 is responsive to the measured voltage to operate the switch 144, e.g. depending on whether or not the measured voltage exceeds a threshold level.

Figure 6:
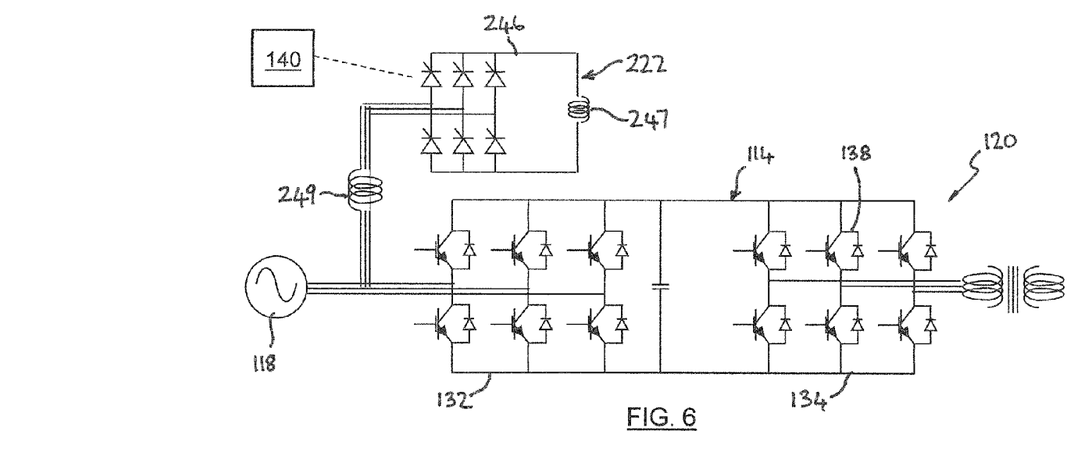
FIG. 6 is a schematic diagram of a second embodiment of an electrical generator system embodying one aspect of the invention.

Similar to FIG. 5, in the embodiment of FIG. 6, the auxiliary system 222 is operable to reduce voltage level output by the generator 120. The auxiliary system 222 comprises an ac-dc converter 246, for example in the form of a thyristor bridge rectifier, that is operable as a switch to selectably connect or disconnect the auxiliary system 222 to the generator system 120, e.g. to the output of the generator 118, or the input of the frequency converter 114, or a point inbetween. In particular, the ac-dc converter 246 is connected to or disconnected from the generator system 120 when switched on and off, respectively. Conveniently, the controller 140 controls the operation of the ac-dc converter 246 (by providing appropriate signals to the thyristor control inputs in this example). To this end, the controller 140 optionally provides a phase-controlled rectifier input, but may alternatively turn the converter 246 on and off depending on whether or not the measured voltage exceeds a threshold level as described above in relation to FIG. 5. The auxiliary system 222 also comprises a reactive load, which advantageously is provided by the ac-dc converter 246. When operated with phase-controlled switching of the thyristors, the ac-dc converter 246 acts as a reactive load and absorbs reactive power from the generator 118 to reduce output voltage level as described above. Preferably, the auxiliary system 222 includes an inductor 247 at its dc side to ensure continuous current through the thyristors when switched on. The auxiliary system 222 may be coupled to the generator system 120 by an inductor 249 to prevent or at least restrict any interference between the switching operations of the ac-dc converter and the operation of the frequency converter 114. Inductor 247 contributes to the provision of the reactive load although that is not its main function.

Figure 7:
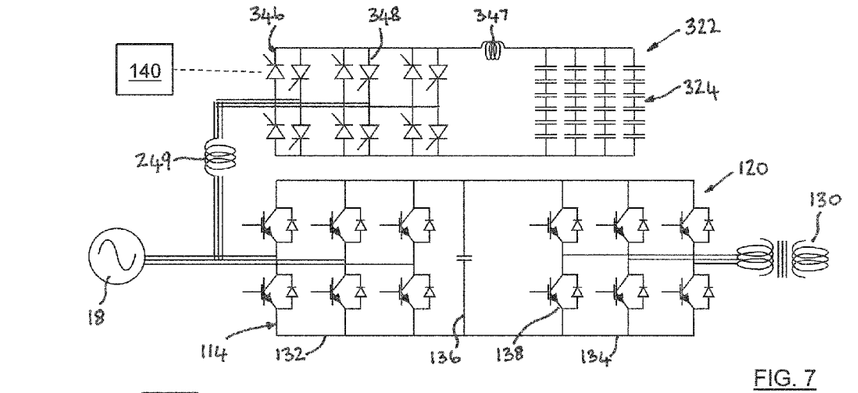
FIG. 7 is a schematic diagram of a third embodiment of an electrical generator system embodying one aspect of the invention.

In the embodiment of FIG. 7, the auxiliary system 322 includes an energy store 324 comprising at least one energy storage device, for example, a bank of capacitors, or preferably supercapacitors. The system 322 also includes a reactive load and a switch, conveniently provided jointly by an ac-dc converter 346 for example as described above in relation to FIG. 6. The auxiliary circuit 322 is operable in a first mode in which it absorbs reactive power from the generator 118. In the first mode, the auxiliary circuit 322 is connected to generator system 120 so as to provide a reactive load, for example as described above in relation to FIG. 6. As before, this has the effect of reducing the output voltage level of the generator 118. In the first mode, the auxiliary system 322 also transfers real power to the energy store 324, in this example via the ac-dc converter 346 when switched on thereby storing energy in the store 324. The auxiliary system preferably includes an inductor at its dc side to ensure continuous current through the thyristors when switched on. Advantageously, the auxiliary system 322 is operated in the first mode (under control of the controller 140) during periods when, otherwise, excessive voltage levels from the generator 118 may damage the converter 114, e.g. during periods of excessively high fluid flow velocity caused by turbulence of excessive flow velocity. The first mode may be effected in response to detecting an above-threshold voltage level from the generator 118 as described above in relation to FIGS. 5 and 6. Preferably, however, the first mode is effected in response to detecting an above-threshold power level from the generator 118 as described above in relation to FIGS. 3 and 4. To this end any convenient power meter (not shown) may be provided to monitor (directly or indirectly) the power output of the generator 118, the controller 140 operating the system 322 in response to the detected power level. The power level may be monitored and/or controlled with respect to any convenient point in the system 120, e.g. at the input side or output side of the frequency converter 114, or within the frequency converter 114.

The auxiliary system 322 is operable in a second mode (under control of the controller 140) in which energy stored in the energy store 324 is returned to the generator system 120 as described above in relation to FIGS. 3 and 4. The auxiliary system 322 includes a dc-ac converter 348 that is operable (conveniently by controller 140) to convert a dc voltage or current available from the energy store 324 into a corresponding ac voltage or current for return to the system 120 in the second mode. In this example, the dc-ac converter 348 comprises a thyristor bridge circuit. Conveniently, the controller 140 controls the operation of the dc-ac converter 348 (by providing appropriate signals to the thyristor control inputs in this example). Conveniently, the ac-dc converter 346 and dc-ac converter 348 are provided together as a bi-directional converter. Preferably, the system 322 is operated in the second mode during periods when relatively low power is produced by the generator 118 in order to smooth the generator's output power as described above in relation to FIGS. 3 and 4. Alternatively the auxiliary system 322 may be operated in the second mode during periods when the output voltage level of the generator 118 drops below a threshold level. In this embodiment, the auxiliary system 324, and more particularly the dc-ac converter 348, is arranged to return energy from the energy store 324 to the generator system 120 at the input side of the frequency converter 114.

Figure 8:
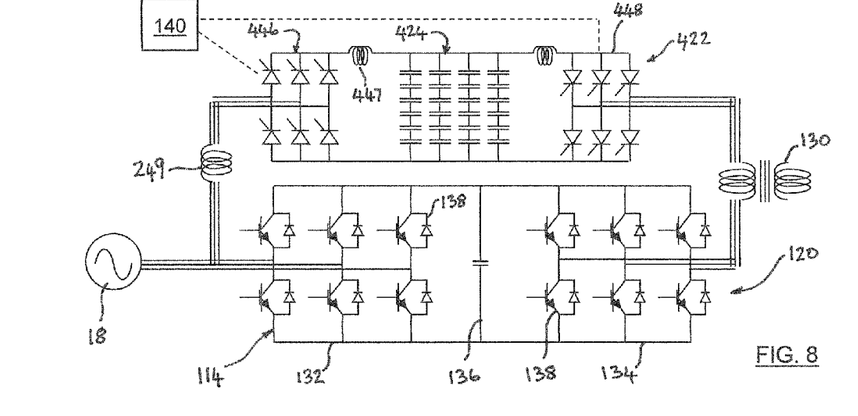
FIG. 8 is a schematic diagram of a fourth embodiment of an electrical generator system embodying one aspect of the invention.

Referring now to the embodiment of FIG. 8, the auxiliary system 422 and its operation are similar to the auxiliary system 422 of FIG. 7 except that the system 422, and in particular the dc-ac converter 448, is arranged to return the stored energy to the output side of the frequency converter 114. In the illustrated embodiment, the energy store 424 is provided in parallel between the ac-dc converter 446 and the dc-ac converter 448. The output of the auxiliary system 422, and more particularly of the dc-ac converter 448, may be combined with the output from the frequency converter 114 by connection to a common transformer winding 450 (as illustrated) or to a separate winding or tap on a common side of the transformer 130.

Figure 9:
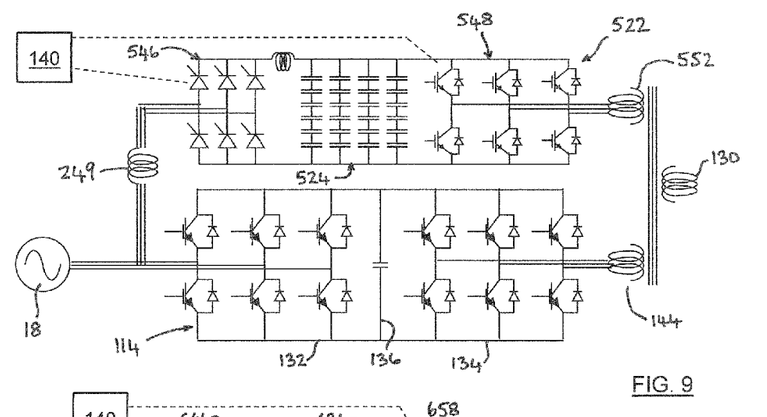
FIG. 9 is a schematic diagram of a fifth embodiment of an electrical generator system embodying one aspect of the invention.

The embodiment of FIG. 9 is similar to that of FIGS. 7 and 8 except that the dc-ac converter 548 comprises a voltage-source inverter. The output of the dc-ac converter 548, and more particularly the voltage-source inverter, is combined with the output from the frequency converter 114 by connection to a separate winding 552 or tap on a common side of the transformer 130. Preferably the winding 552 is configured to provide a voltage lower than that provided by the frequency converter 114 via winding 144. Operation of the energy storage device 524 is possible over a range of voltages with a lower limit set by the voltage of the transformer winding 552.

Figure 10:
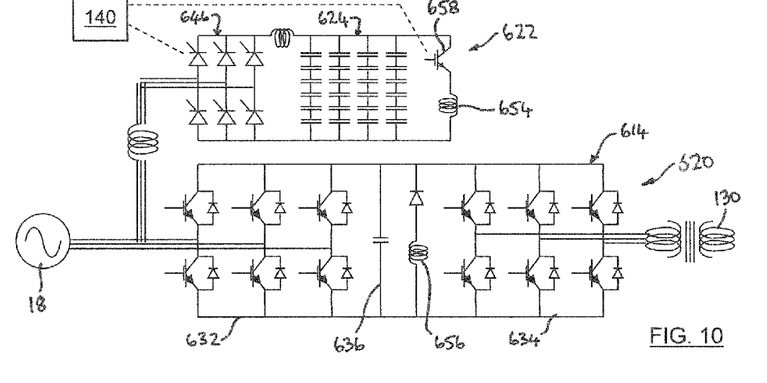
FIG. 10 is a schematic diagram of a sixth embodiment of an electrical generator system embodying one aspect of the invention.

In the embodiment of FIG. 10, the auxiliary system 622 returns the stored energy from the store 624 to a modified frequency converter 614 between its ac-dc converter stage and its dc-ac inverter stage, conveniently via the DC link 636. This may be achieved by any suitable energy coupling device for example a transformer having one winding 654 (the primary) connected to the energy store 624 and the other winding 656 (the secondary) provided in the frequency converter 614, preferably in parallel with the DC link 636 between the ac-dc and dc-ac conversion stages. This may take the form of a dc-dc converter or flyback converter. A flyback converter works as follows: an dc-dc converter comprises a switch operating at high frequency, typically 3 kHz, in series with the primary winding of a transformer. During the on period, the flux in the transformer magnetic circuit increases and during the off period it reduces and induces a negative voltage in the winding such that the net voltage has a mean value of zero when averaged over a complete cycle. The transformer secondary has an induced voltage which is equal to the primary voltage multiplied by the ratio of secondary to primary winding turns. The switch only allows current to flow from the energy store into the transformer primary, The diode connected in series with the secondary winding allows current to flow from the secondary into the positive side of the dc link. Therefore power is absorbed from the energy store and delivered to the dc link at a different voltage.

A switch 658 is provided to connect or disconnect the winding 654 to store 624 to allow the store 624 to energize the winding 654 and so to correspondingly energize the winding 656. The controller 140 allows the switch 658 of the converter to be operated or not according to whether power is required to be transferred from the energy store to the DC link 636. Typically a diode 660 is provided in series with the secondary winding 656. Hence, under control of the controller 140 energy from the store 624 can be used to increase the voltage or power output from the frequency converter 614 in comparison to what is provided directly from the generator 118. Preferably, the ac-dc converter stage operates at a capped power level that is equal to the power produced by an average fluid flow rate, or a mean power level, but which is reduced when the fluid flow rate is below average. In such periods, energy can be provided from the energy store 624 as described. To this end, it is preferred that the dc-ac converter stage of the converter 614 has a higher capacity than the ac-dc stage. In preferred embodiments, power is monitored by the controller 140, and the auxiliary system 622 operated accordingly, to maintain the total power level into the DC link 636 at a steady level, e.g. corresponding to the desired mean power level.

It will be apparent that the embodiments of FIGS. 5 to 9 may be retro-fitted to conventional generator systems since the frequency converter 114 and its. control may be conventional. Also, the auxiliary systems of these embodiments may fail without compromising the operation of the frequency converter 114. Embodiments of the invention may be compatible with medium voltage or high voltage generators and converters. Preferred embodiments enable mean output power to be increased, and can be used to compensate for turbulence-caused power excursions, while reducing incidence of power cut-outs.

Suitable devices for use in the provision of the energy store 24 include: supercapacitors, capacitors, inductors, flywheels, compressed gas devices, chargeable batteries.

The invention is not limited to the embodiments described herein which may be modified or varied without departing from the scope of the invention.

The invention claimed is:

1. A method of protecting a device from excessive voltages produced by a generator for producing AC electrical power, the method comprising:
monitoring the voltage level produced by the generator;
operating, in response to determining that said voltage level exceeds a threshold value, an auxiliary system to absorb reactive power from said generator; and
providing said AC electrical power from said generator to an end system via a frequency converter, wherein said operating involves operating said auxiliary system to absorb reactive power from a location at or before an input of said frequency converter.

2. A method as claimed in claim 1, including operating said auxiliary system not to absorb reactive power from said generator upon determining that the voltage level output by said generator is below said threshold value or a second threshold value.

3. A method as claimed in claim 1, further including configuring said auxiliary system to provide a reactive load to said generator; connecting said auxiliary system directly or indirectly to the output of the generator upon detection that said voltage exceeds the threshold value.

4. A method as claimed in claim 3, further including disconnecting said auxiliary system from the output of the generator upon determining that said voltage is less than said threshold value or a second threshold value.

5. A method as claimed in claim 1 including:
diverting, in response to said monitored voltage level exceeding a threshold level, the power from the output of said generator to said auxiliary system; and
charging at least one energy storage device with said diverted power.

6. A method as claimed in claim 5, further including delivering, in response to said voltage being less than said threshold value or said second threshold value or in response to the power produced by the generator being below a threshold level, power to said end system from said auxiliary system by discharging said at least one energy storage device.

7. A method as claimed in claim 1, wherein said generator is a single generator.

8. A method as claimed in claim 1, wherein said generator comprises a turbine generator for generating power in response to flow of a driving fluid.

9. A method as claimed in claim 1, wherein said monitoring and operating are performed in response to variations in said generator output voltage level detected over a period of between 1 second and 60 seconds, or a period of between 1 minute and 10 minutes.

10. The method of claim 1, including:
monitoring the power produced by the generator;
diverting, in response to said monitored power or said monitored voltage exceeding a respective threshold level, power from the output of said generator to the auxiliary system; and
charging at least one energy storage device with said diverted power.

11. The method of claim 10, including delivering, in response to said monitored power or said monitored voltage being below a respective threshold level, power to said end system from said auxiliary system by discharging said at least one energy storage device.

12. A method as claimed in claim 1, wherein said threshold value for operating said auxiliary system to absorb reactive power from said generator is determined by a voltage rating of said frequency converter.

13. A power generation system comprising a generator coupled to an end system, and an auxiliary system configured to selectably present an inductive load to the output of said generator, the system further including:
monitoring means for monitoring the voltage level produced by the generator; and
operating means for operating, in response to determining that said voltage level exceeds a threshold value, said auxiliary system to absorb reactive power from said generator, wherein said generator is connected to said end system via a frequency converter, said auxiliary system being selectably connectable by said operating means directly or indirectly to a location at or before an input of said frequency converter.

14. A system as claimed in claim 13, wherein said auxiliary system is arranged to provide a reactive load to said generator and is selectably connectable by said operating means directly or indirectly to the output of the generator.

15. A system as claimed in claim 14, wherein said operating means is configured to connect said auxiliary system directly or indirectly to the output of the generator upon detection that said voltage exceeds the threshold value.

16. A system as claimed in claim 14, wherein said operating means is configured to disconnect said auxiliary system from the output of the generator upon determining that said voltage is less than said threshold value or a second threshold value.

17. A system as claimed in claim 14, wherein said frequency converter comprises a rectifier-inverter architecture.

18. A system as claimed in claim 14, wherein said said frequency converter comprises an AC to DC to AC frequency converter.

19. A system as claimed in claim 14, wherein said frequency converter comprises an electronic frequency converter.

20. A system as claimed in claim 13, wherein said threshold value for operating said auxiliary system to absorb reactive power from said generator is determined by a voltage rating of said frequency converter.

* * * * *